May 28, 1957  F. G. KERKVLIET  2,793,615
FEED BUNKER LOADER
Filed April 20, 1954  3 Sheets-Sheet 1

Ferdinard G. Kerkvliet
INVENTOR.

May 28, 1957 F. G. KERKVLIET 2,793,615
FEED BUNKER LOADER

Filed April 20, 1954 3 Sheets-Sheet 2

Ferdinard G. Kerkvliet
INVENTOR.

BY *Clarence A. O'Brien*
*and Harvey B. Jackson*
Attorneys

May 28, 1957  F. G. KERKVLIET  2,793,615
FEED BUNKER LOADER

Filed April 20, 1954  3 Sheets-Sheet 3

Ferdinard G. Kerkvliet
INVENTOR.

United States Patent Office 2,793,615
Patented May 28, 1957

2,793,615
FEED BUNKER LOADER
Ferdinand G. Kerkvliet, Larchwood, Iowa
Application April 20, 1954, Serial No. 424,411
4 Claims. (Cl. 119—52)

This invention relates to a feed bunker loader, and more particularly provides a device for evenly distributing feed to a plurality of feeding areas along the length of a feed bunker thereby facilitating the distribution of feed to animals.

An object of this invention is to provide a feed bunker loader which is simple in construction, efficient in operation, accurate in dispensing, well adapted for its intended purposes and relatively inexpensive to manufacture and maintain.

Another object of this invention is to provide a feed bunker loader having an elongated screw-type auger conveyor with one end positioned adjacent the feed supply and a feed bunker positioned along the length of the conveyor and positioned below the same for receiving the feed carried by and discharged by the conveyor.

A still further object of this invention is to provide a feed bunker loader having a pair of right angularly arranged conveyors with the first conveyor feeding the second conveyor and suitable feed bunkers arranged therealong and discharge openings along the conveyor for discharging the feed in evenly measured amounts to various points along the feed bunker.

Yet another important object of this invention is to provide a feed bunker loader especially adapted for use in conjunction with silos for evenly dispensing silage to the feed bunker thereby eliminating the usual prolonged animal feeding operation.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a bottom plan view of a portion of the conveyor trough showing one of the regulating plates.

Figure 1:
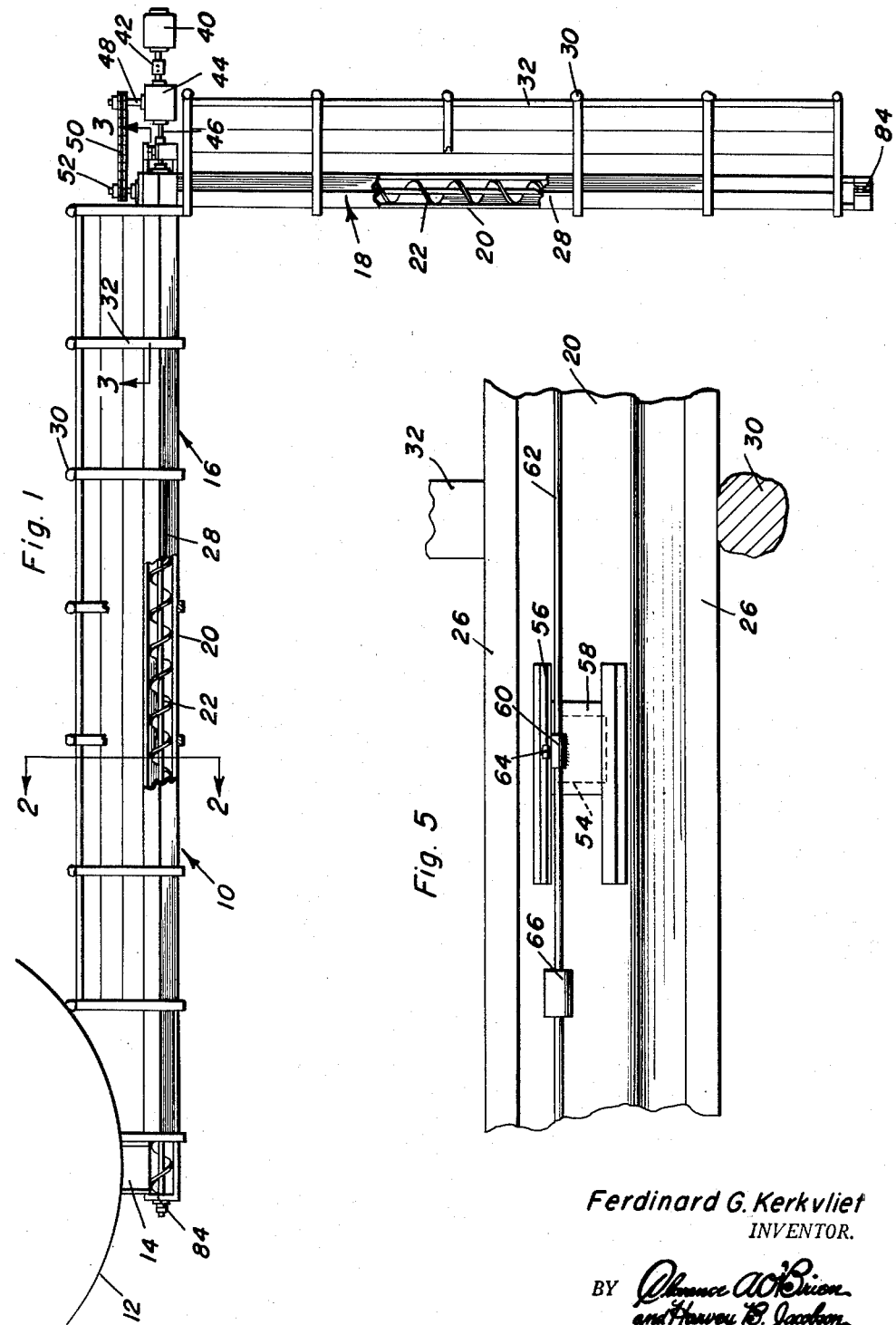
Figure 1 is a top plan view of the feed bunker loader of the present invention with a portion of the conveyor trough covers broken away showing the free floating conveyor augers.

Referring now specifically to the drawings, it will be seen that the numeral 10 generally designates the feed bunker loader of the present invention and the device is especially useful in conjunction with a silo 12 having a loading chute 14, or the like. It will be understood that the device may be utilized with any type of feed supply and the chute 14 may or may not be used as desired and required by each individual arrangement.

The feed bunker loader 10 includes generally a pair of right angularly disposed conveyors 16 and 18 with each of the conveyors 16 and 18 including a generally U-shaped trough 20 having a free floating screw-type auger 22 therein. The upper edges of the U-shaped trough 20 is provided with outwardly extending flanges 24 for engagement and support on a suitable framework 26. An inverted V-shaped cover member 28 is provided over the top of each of the conveyors 16 and 18 for preventing the contamination of the feed in the conveyor by rain, snow, dust, or the like. The framework 26 may be supported from upstanding vertical posts 30 having upper and lower transverse members 32. A feed bunker 34 is supported on the lower transverse member 32 and is generally a rectangular elongated receptacle or trough.

Figure 2:
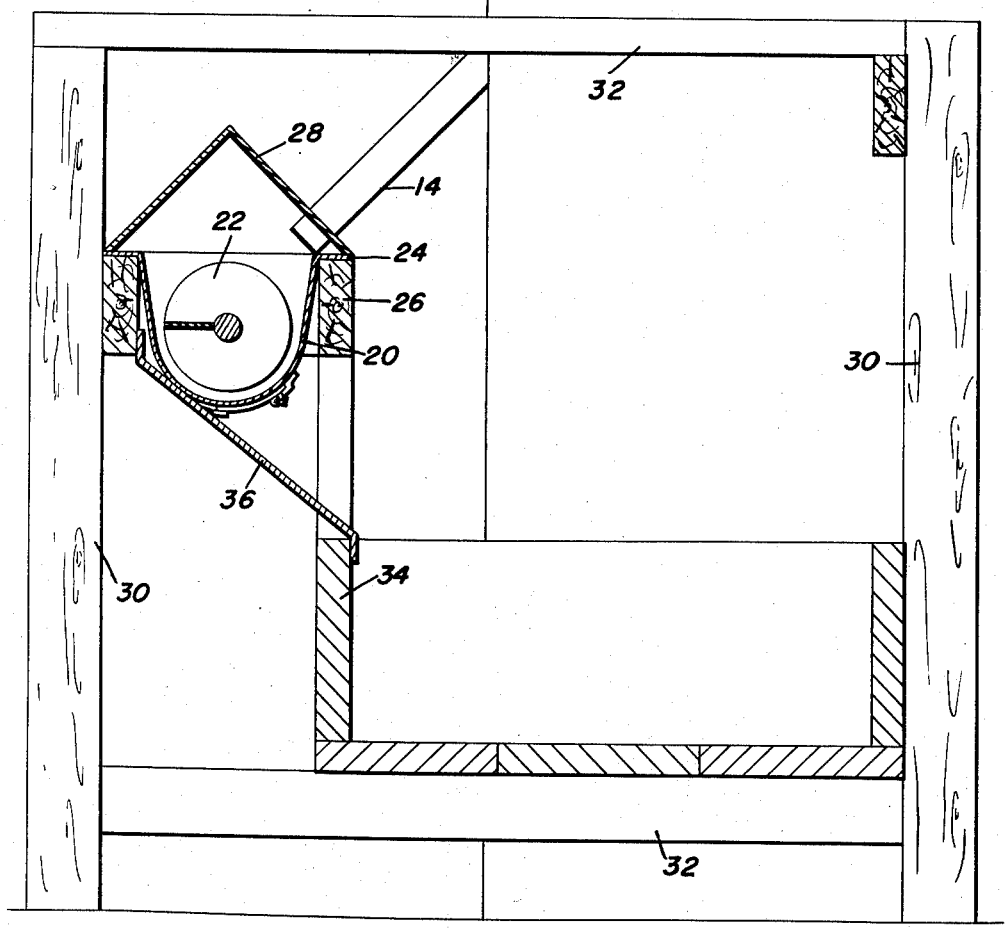
Figure 2 is a transverse section taken substantially along section line 2—2 of Figure 1 showing the details of construction of the conveyor auger, conveyor trough, and the feed bunkers.

Referring now specifically to Figure 2, it will be seen that an elongated plate member 36 is provided with one end inserted into the opened upper end of the elongated feed bunker 34 and the other end secured to the framework 26 adjacent one side of the U-shaped conveyor trough 20. It will be seen that the plate 36 forms an inclined surface in the nature of a chute for a purpose described hereinafter.

Figure 3:
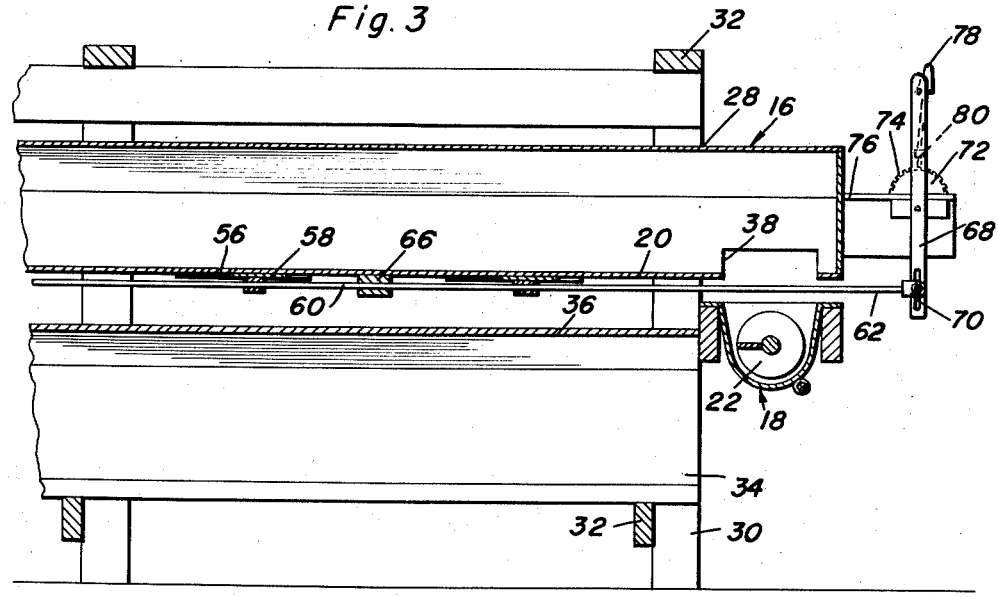
Figure 3 is a longitudinal vertical section taken substantially along section line 3—3 of Figure 1, showing the details of construction of the intersecting conveyors and the relationship of the control rod.

Referring now specifically to Figure 3, it will be seen that the upper conveyor 16 extends over the lower conveyor 18 and the trough 20 around the upper conveyor 16 is provided with an enlarged opening 38 in the lower surface thereof which is positioned directly over the trough 20 of the bottom conveyor 18 and it will be understood that the cover 20 is omitted from this overlapping portion of the lower conveyor 18. It will be seen that the feed will be discharged from the first or upper conveyor 16 into the second or lower conveyor 18 in an obvious manner. Referring now specifically to Figure 1, it will be seen that an electric motor, or the like, 40 is provided with a power shaft 42 supplying rotated power to a gear reduction mechanism 44 wherein the gear reduction mechanism 44 is provided with two output power shafts 46 and 48 extending at right angles to each other. The power shaft 46 is directly connected to the remote end of the screw auger 22 of the upper conveyor 16. The other power shaft 48 is connected through a chain drive 50 to a shaft 52 extending from the end of the screw auger 22 and the outer or lower conveyor 18, thereby driving the screw auger 22 at the same speed and from the same electric motor 40.

Figure 4:
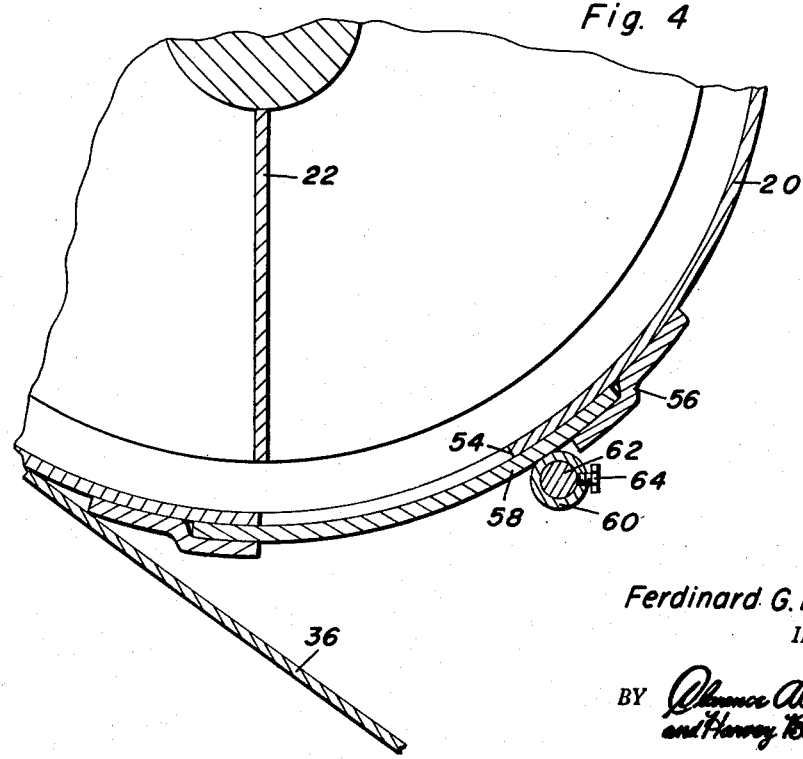
Figure 4 is an enlarged detailed section showing one of the discharge openings and the regulating plate therefor and the relationship of the regulating plate and the operating rod.

Referring now specifically to Figures 4 and 5, it will be seen that the lower surface of the U-shaped trough 20 is provided with a plurality of longitudinally spaced discharge openings 54. An offset clip 56 is secured to the outer surface of the trough 20 adjacent the edge of each of the openings 54. The clips 56 form a channel-like guideway for slidably receiving a closure plate 58 for the aperture 54 thereby regulating the flow or discharge of feed from the discharge aperture 54. Each of the plates 58 is provided with a tubular sleeve 60 welded thereto for receiving an elongated operating rod 62. The operating rod 62 is retained in the sleeve 60 by a suitable set-screw 64 thereby permitting the operating rod 62 to be adjusted in relation to the plate 58. Guide sleeves 66 are provided on the lower surface of the U-shaped trough 20 in spaced relation to the plate 58 for slidably receiving and guiding the operating rod 62 as indicated in Figure 3. The operating rod 62 extends outwardly of the conveyors 16 and 18, respectively, and are slidably and pivotally attached to an operating lever 68 by a suitable pin and slot connection 70. The operating lever or handle 68 is pivotally attached substantially at its center to a segmental quadrant 72 having notches 74 on its upper arcuate surface. The quadrant 72 is mounted on a suitable bracket 76 and includes a release handle 78 for retracting a spring urged dog 80 which engages selected notches 74 for locking the lever 68 in position thereby retaining the plate 58 in adjusted position.

Figure 6:
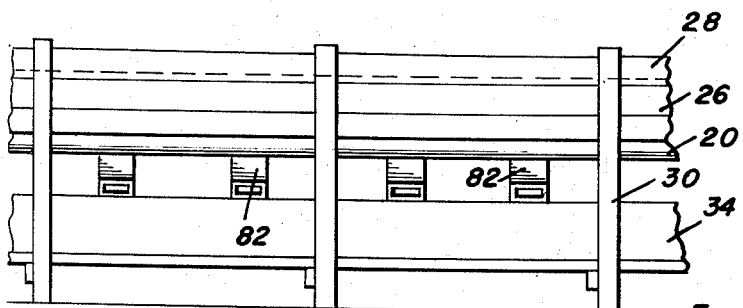
Figure 6 is a side elevational view showing a modified form of the feed bunker loader of the present invention utilizing individual chutes in communication with the discharge openings in the conveyor trough.

Referring specifically to Figure 6, it will be seen that a modified form of the device is utilized wherein the elongated plate 36 is eliminated and an individual chute 82 is provided and receives the feed discharge from the individual openings 54 in the U-shaped trough 20. Further, suitable bearings 84 may be provided on the remote ends of the conveyors 16 and 18, as desired, and also suitable end plates for limiting the movement of feed therethrough.

In operation, feed such as silage, is deposited in the intake end of the first or upper conveyor 16 either through the chute 14, as shown, or any other suitable means, and feed is moved along by the screw auger 22 through the trough 20 and then along the second conveyor 18 in the same manner. The operating lever 68 may be moved to a suitable position thereby opening the discharge opening 54 a predetermined amount and it will be understood that each of the openings 54 are opened an equal amount thereby permitting discharge of an equal amount of feed therethrough whereupon the feed is moved by gravity down the inclined plate 36 into the feed bunkers 34. It will be understood that a suitable operating handle 66 is provided for each conveyor 16 and 18 for ease of adjustment of the discharge openings 54. Obviously, the various components of the invention may be constructed of well known materials which are corrosive resistant and long lasting. Obviously, the feed bunker loader of the present invention greatly reduces the time required for feeding a large number of animals such as cattle, especially during the winter months.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A feed bunker loader comprising a first and second elongated trough arranged in angular relation, a screw type auger rotatably positioned in each trough thereby forming intersecting conveyors, means for supplying feed to said first trough, said first trough terminating above the second trough for discharging feed into the second trough, common drive means for said augers, said drive means being positioned at the point of intersection of said troughs, an elongated feed receptacle positioned under each of said troughs in offset parallel relation so that animals may gain access thereto, each of said troughs having a plurality of longitudinally spaced discharge openings, a sliding closure plate providing a closure for each of said openings, an elongated rod interconnecting the closure plates on each trough, handle means simultaneously adjusting said closure plates for controlling the discharge therefrom, and downwardly inclined means guiding the feed from the discharge openings into the elongated feed receptacles whereby the feed will be deposited in the receptacles in spaced areas for access by a single animal to the feed discharged from a single discharge opening.

2. A feed bunker loader comprising a first and second elongated trough arranged in angular relation, a screw type auger rotatably positioned in each trough thereby forming intersecting conveyors, means for supplying feed to said first trough, said first trough terminating above the second trough for discharging feed into the second trough, common drive means for said augers, said drive means being positioned at the point of intersection of said troughs, an elongated feed receptacle positioned under each of said troughs in offset parallel relation so that animals may gain access thereto, each of said troughs having a plurality of longitudinally spaced discharge openings, a sliding closure plate providing a closure for each of said openings, an elongated rod interconnecting the closure plates on each trough, handle means simultaneously adjusting said closure plates for controlling the discharge therefrom, and downwardly inclined means guiding the feed from the discharge openings into the elongated feed receptacles whereby the feed will be deposited in the receptacles in spaced areas for access by a single animal to the feed discharged from a single discharge opening, said inclined means including an elongated plate extending from each of said troughs to each of said receptacles.

3. A feed bunker loader comprising a first and second elongated trough arranged in angular relation, a screw type auger rotatably positioned in each trough thereby forming intersecting conveyors, means for supplying feed to said first trough, said first trough terminating above the second trough for discharging feed into the second trough, common drive means for said augers, said drive means being positioned at the point of intersection of said troughs, an elongated feed receptacle positioned under each of said troughs in offset parallel relation so that animals may gain access thereto, each of said troughs having a plurality of longitudinally spaced discharge openings, a sliding closure plate providing a closure for each of said openings, an elongated rod interconnecting the closure plates on each trough, handle means simultaneously adjusting said closure plates for controlling the discharge therefrom, and downwardly inclined means guiding the feed from the discharge openings into the elongated feed receptacles whereby the feed will be deposited in the receptacles in spaced areas for access by a single animal to the feed discharged from a single discharge opening, said inclined means including an individual hollow chute extending from each of said openings downwardly to the elongated receptacle positioned thereunder.

4. A feed bunker loader comprising a first and second elongated trough arranged in angular relation, a screw type auger rotatably positioned in each trough thereby forming intersecting conveyors, means for supplying feed to said first trough, said first trough terminating above the second trough for discharging feed into the second trough, common drive means for said augers, said drive means being positioned at the point of intersection of said troughs, an elongated feed receptacle positioned under each of said troughs in offset parallel relation so that animals may gain access thereto, each of said troughs having a plurality of longitudinally spaced discharge openings, a sliding closure plate providing a closure for each of said openings, an elongated rod interconnecting the closure plates on each trough, handle means simultaneously adjusting said closure plates for controlling the discharge therefrom, and downwardly inclined means guiding the feed from the discharge openings into the elongated feed receptacles whereby the feed will be deposited in the receptacles in spaced areas for access by a single animal to the feed discharged from a single discharge opening, each of said closure plates having a sleeve thereon encircling said rod, and means locking the sleeve in longitudinally adjusted position on said rod thereby permitting variation in the rate of discharge of feed from the discharge openings.

References Cited in the file of this patent

UNITED STATES PATENTS

| 1,462,461 | Caldwell | July 17, 1923 |
|---|---|---|
| 1,735,920 | Fitzhugh | Nov. 19, 1929 |
| 2,015,954 | Mitchell | Oct. 1, 1935 |
| 2,571,637 | Weist | Oct. 16, 1951 |
| 2,646,023 | Virgil | July 21, 1953 |
| 2,715,887 | Flannery et al. | Aug. 23, 1955 |
| 2,738,765 | Hart | Mar. 20, 1956 |

FOREIGN PATENTS

| 480,274 | Germany | July 31, 1929 |